United States Patent [19]

Furutani et al.

[11] Patent Number: 5,668,247

[45] Date of Patent: *Sep. 16, 1997

[54] THERMOPLASTIC POLYIMIDE, POLYAMIDE ACID, AND THERMALLY FUSIBLE LAMINATED FILM FOR COVERING CONDUCTIVE WIRES

[75] Inventors: Hiroyuki Furutani; Kazuhisa Danno; Yoshifumi Okamoto; Junya Ida; Yoshihide Oonari; Hitoshi Nojiri; Hirosaku Nagano, all of Otsu, Japan

[73] Assignee: Kanegafuchi Kagaku Kogyo Kabushiki Kaisha, Osaka, Japan

[*] Notice: The term of this patent shall not extend beyond the expiration date of Pat. No. 5,621,068.

[21] Appl. No.: 167,024

[22] Filed: Dec. 16, 1993

[30] Foreign Application Priority Data

| | | | |
|---|---|---|---|
| Dec. 16, 1992 | [JP] | Japan | 4-355005 |
| Dec. 25, 1992 | [JP] | Japan | 4-358178 |
| Jul. 27, 1993 | [JP] | Japan | 5-205885 |
| Jul. 27, 1993 | [JP] | Japan | 5-205886 |

[51] Int. Cl.$^6$ .................................................. C08G 73/10
[52] U.S. Cl. .......................... 528/353; 528/125; 528/128; 528/170; 528/171; 528/172; 528/173; 528/175; 528/176; 528/183; 528/185; 528/188; 528/220; 528/229; 528/350; 528/352; 428/411.1; 428/473.5
[58] Field of Search ........................... 528/353, 175, 528/350, 171, 183, 125, 128, 170, 172, 173, 185, 176, 352, 188, 220, 229; 428/473.5, 411.1

[56] References Cited

U.S. PATENT DOCUMENTS

| | | | |
|---|---|---|---|
| 3,179,630 | 4/1965 | Laszlo | 528/353 |
| 3,179,634 | 4/1965 | Edwards | 528/353 |
| 3,505,168 | 4/1970 | Dunphy et al. | 161/227 |
| 3,770,573 | 11/1973 | Dunphy et al. | 161/227 |
| 4,778,872 | 10/1988 | Sasaki et al. | 528/176 |
| 5,070,181 | 12/1991 | Kawai et al. | 528/353 |
| 5,260,413 | 11/1993 | Ochsner et al. | 528/353 |

FOREIGN PATENT DOCUMENTS

| | | |
|---|---|---|
| 4-162491 | 6/1992 | Japan . |
| 4-207094 | 7/1992 | Japan . |
| 5131596 | 5/1993 | Japan . |

*Primary Examiner*—James J. Seidleck
*Assistant Examiner*—P. Hampton-Hightower
*Attorney, Agent, or Firm*—Cushman Darby & Cushman IP Group of Pillsbury Madison & Sutro LLP

[57] ABSTRACT

The invention provides novel thermoplastic polyimide featuring solid adhesive property under low temperature, low hygroscopic coefficient, and solid resistivity to radioactive rays. The invention also provides novel polyamide acid which is substantially precursor of the thermoplastic polyimide, and also provides novel thermally fusible laminated film for covering conductive wires, featuring solid adhesive property under low temperature, solid resistivity to radioactive rays, and distinct suitability for covering superconductive wires in particular.

The novel thermoplastic polyimide is represented by general formula (1) corresponding to the chemical structure shown below;

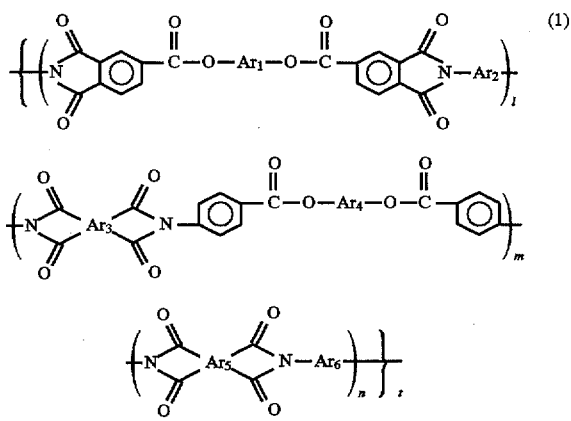

wherein, $Ar_1$, $Ar_2$, $Ar_4$, and $Ar_6$, respectively designate divalent organic radical, whereas $Ar_3$ and $Ar_5$ respectively designate quadrivalent organic radical, wherein, 1, m, and n, respectively designate positive integer 0 to 1 or more than 1, wherein the sum of 1 and m aggregates 1 or more than 1, and wherein t designates positive integer of 1 or more than 1.

15 Claims, 1 Drawing Sheet

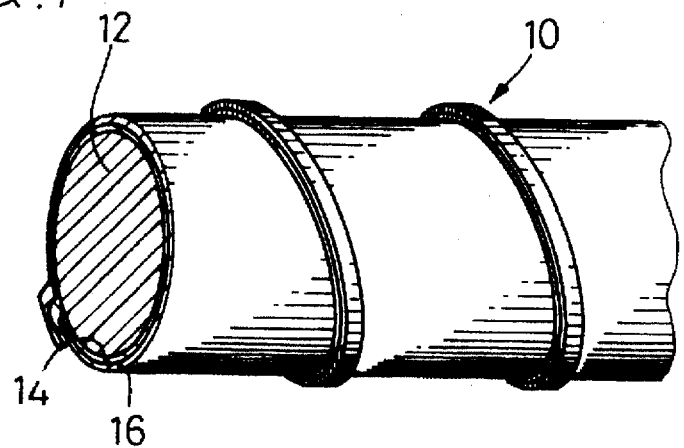
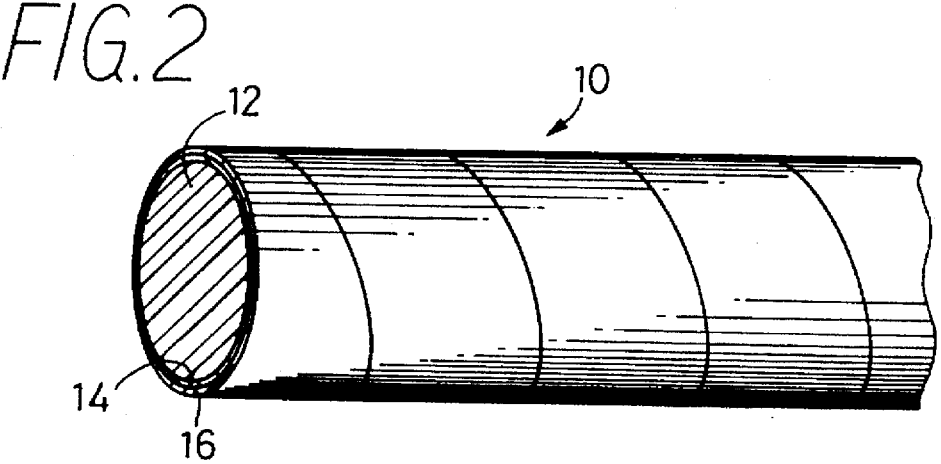
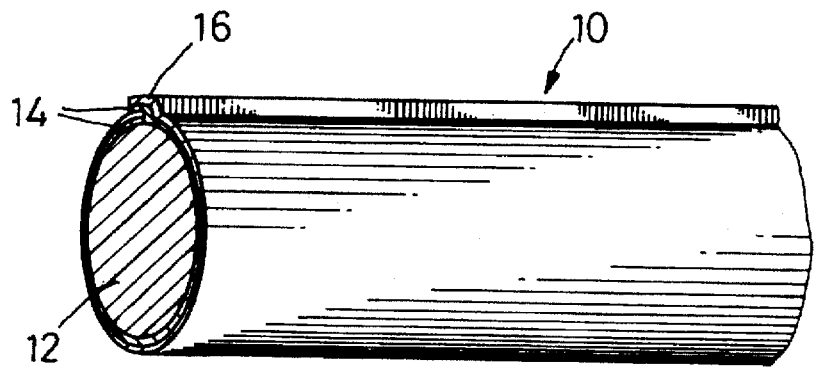

THERMOPLASTIC POLYIMIDE, POLYAMIDE ACID, AND THERMALLY FUSIBLE LAMINATED FILM FOR COVERING CONDUCTIVE WIRES

BACKGROUND OF THE INVENTION

The present invention relates to novel thermoplastic polyimide, novel polyamide acid being precursor of the thermoplastic polyimide, and novel thermally fusible laminated film particularly suited for covering electric wires by way of incorporating layer of welding agent comprising the novel thermoplastic polyimide. More particularly, the invention relates to novel thermoplastic composition featuring solid adhesive property under low temperature and solid resistivity to radioactive rays, and yet, the invention relates to novel polyamide acid being precursor of the thermoplastic polyimide composition and novel thermally fusible laminated film particularly suited for covering conductive wires by way of featuring satisfactory workability, softness, and solid adhesive property. In particular, the novel thermally fusible laminated film exerts distinct resistivity to radioactive rays.

Owing to solid thermal resistant property, satisfactory physical properties under low temperature, durable resistance against chemicals, and satisfactory electrical characteristic, polyimide film has widely been used for composing a variety of components built in electric and electronic apparatuses. However, since polyimide conventionally being used in the form of film is generally insoluble and infusible, in the course of enveloping metallic wires with polyimide film, normally, resinous layers having thermal fusibility are laminated on the polyimide film.

On the other hand, as a result of significant development of modern physics in the field of element particles in recent years, construction of improved accelerators has been promoted to generate higher energy. In order to securely generate higher energy, it is imperative for all the concerned to generate extremely intense magnetic field by means of those magnets capable of receiving and transmitting enormous electric current. Recently, many examples are cited regarding the use of superconductive magnets incorporating superconductive wires. In many cases, oxide mainly comprising copper is used for composing superconductive wires. However, when using adhesive agent made from thermosetting resin to cover the superconductive wires with insulated covering material, after executing a thermal treatment, proportion of oxide components in the superconductive wires is easily variable to result in the degraded physical properties of the superconductive magnets. To prevent this, it is imperative for the concerned to use such an adhesive agent that securely cures itself and adheres to the superconductive wires under low temperature.

Initially, the above-cited accelerator accelerates movement of elementary particles comprising protons/protons and electrons/electrons to cause them to collide with each other and collapse themselves before investigating particles generated therefrom. Therefore, as a matter of course, an enormous amount of radioactive rays are generated therefrom. Because of this reason, it is imperative that insulated covering material and superficially applied adhesive agent sharing part of the superconductive magnet be extremely resistive to radioactive rays.

Conventionally, in order to properly cover superconductive wires serving under extremely low temperature, such a covering material composed of layers of thermosetting resin mainly comprising epoxy resin laminated on a polyimide film has been used. However, in this case, in order to cure epoxy resin, high temperature is compulsorily applied for a long period of time to cause superconductive wires to unavoidably incur degradation. Furthermore, epoxy resin cannot fully resist radioactive rays, and yet, in anticipation that a greater amount of radioactive rays will be generated in proportion to expansion of the capacity of accelerators, an early development of more effective adhesive agent capable of exerting sufficient adhesion under extremely low temperature and full resistivity against radioactive rays has long been desired.

To solve those technical problems cited above, using such adhesive agent capable of curing itself under extremely low temperature, superconductive wires can be prevented from incurring unwanted degradation. On the other hand, since this adhesive agent quickly cures itself in normal temperature, shell life of this adhesive agent in B-stage is so short that this adhesive agent cannot commercially be offered for use in the form of laminated film.

BRIEF SUMMARY OF THE INVENTION

Therefore, in order to fully solve those problems described above, inventors followed up overall researches to materialize novel polyimide adhesive agent capable of securely exerting solid adhesion under low temperature and solid resistance against radioactive rays, novel thermoplastic polyimide suited for use in the form of adhesive film, and novel thermally fusible laminated film suited for covering conductive wires, wherein the thermally fusible laminated film can fully protect the enveloped wires from unwanted degradation during a thermal fusion process and contains outstanding softness and adhesive property.

Fundamentally, the novel thermoplastic polyimide materialized by the invention is represented by general formula (1) corresponding to the chemical structure shown below;

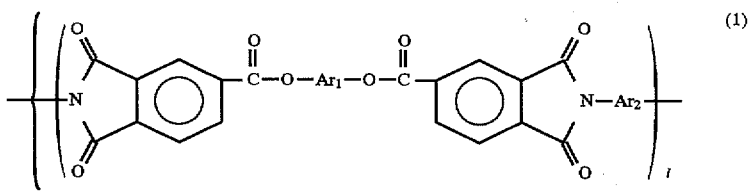

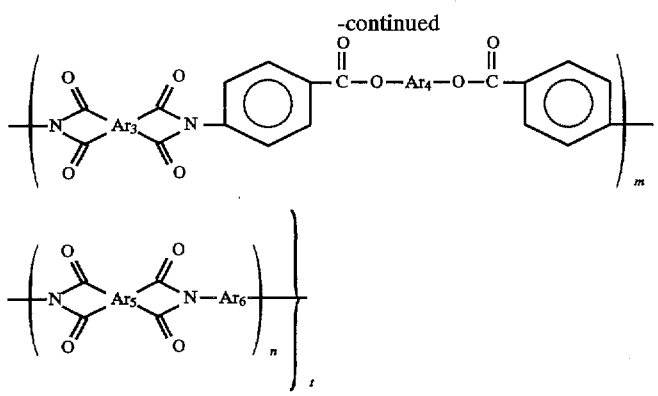

wherein $Ar_1$, $Ar_2$, $Ar_4$, and $Ar_6$, respectively designate divalent organic radical, whereas $Ar_3$ and $Ar_5$ respectively designate quadrivalent organic radical, wherein, l, m, and n respectively designate positive integer of 0 or 1 or more than 1, wherein the sum of l and m aggregates 1 or more than 1, and wherein t designates positive integer 1 or more than 1.

Among components of the novel thermoplastic polyimide, $Ar_1$ shown in the general formula (1) is at least one kind selected from a group of divalent organic radicals corresponding to the chemical structure shown below.

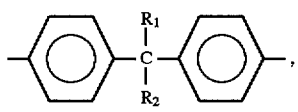

$R_1$, $R_2$ = H, $CH_3$, $CH_2CH_3$, Ph,

—$H_2C$—$CH_2$—,

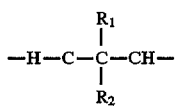

$R_1$, $R_2$ = H, $CH_3$, $CH_2CH_3$, Ph,

Among components of the novel thermoplastic polyimide, $Ar_2$ shown in the general formula (1) is at least one kind selected from a group of divalent aromatic radicals corresponding to the chemical structure shown below.

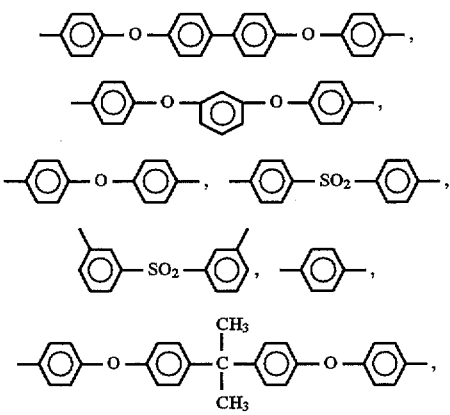

Among components of the novel thermoplastic polyimide, $Ar_3$ shown in the general formula (1) is at least one kind selected from a group of quadrivalent organic radicals corresponding to the chemical structure shown below.

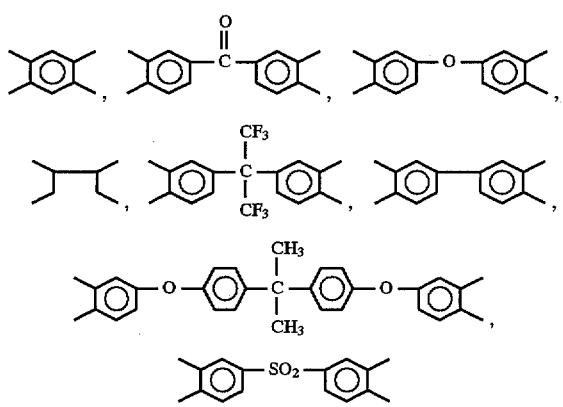

Among components of the novel thermoplastic polyimide, $Ar_4$ shown in the general formula (1) is at least one kind selected from a group of divalent organic radicals corresponding to the chemical structure shown below.

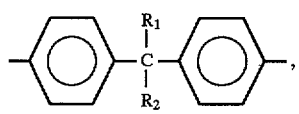

R₁, R₂ = H, CH₃, CH₂CH₃, Ph,

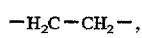

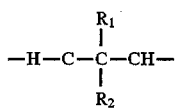

R₁, R₂ = H, CH₃, CH₂CH₃, Ph,

Among components of the novel thermoplastic polyimide, Ar₅ shown in the general formula (1) is at least one kind selected from a group of quadrivalent organic radicals corresponding to the chemical structure shown below.

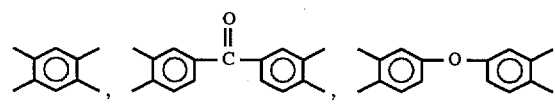

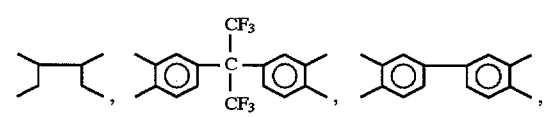

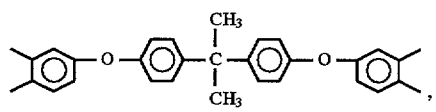

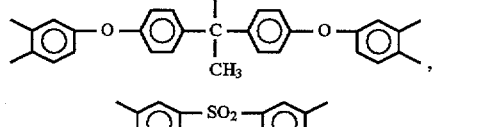

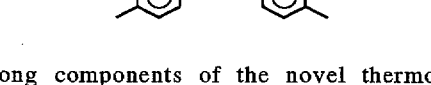

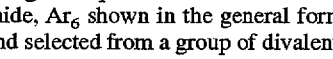

Among components of the novel thermoplastic polyimide, Ar₆ shown in the general formula (1) is at least one kind selected from a group of divalent aromatic radicals corresponding to the chemical structure shown below.

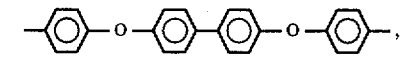

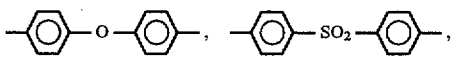

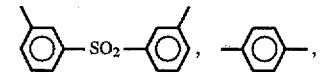

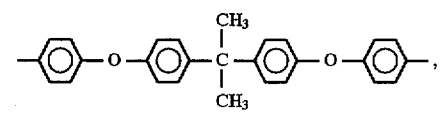

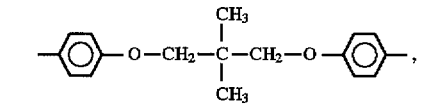

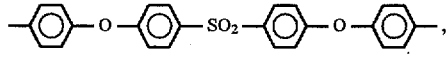

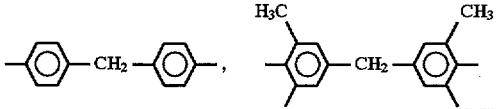

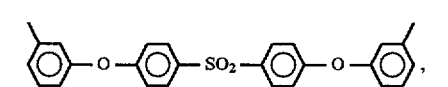

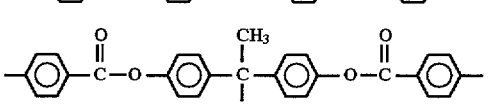

In particular, the novel thermoplastic polyimide is further represented by general formula (2) corresponding to the chemical structure shown below;

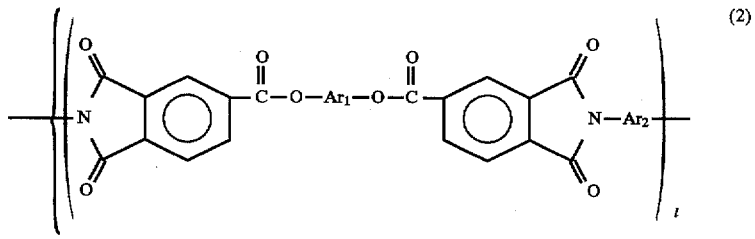

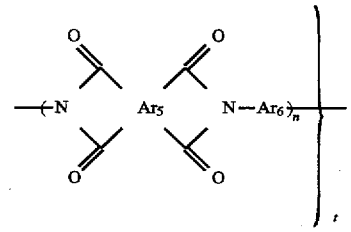

(2)

wherein $Ar_1$, $Ar_2$, and $Ar_6$, respectively designate divalent organic radical, whereas $Ar_5$ designates quadrivalent organic radical, wherein l and t respectively designate positive integer 1 or more than 1, and wherein n designates positive integer 0 or 1 or more than 1.

Fundamentally, the novel polyamide acid being precursor of the novel thermoplastic polyimide materialized by the invention is represented by general formula (3) corresponding to the chemical formula shown below;

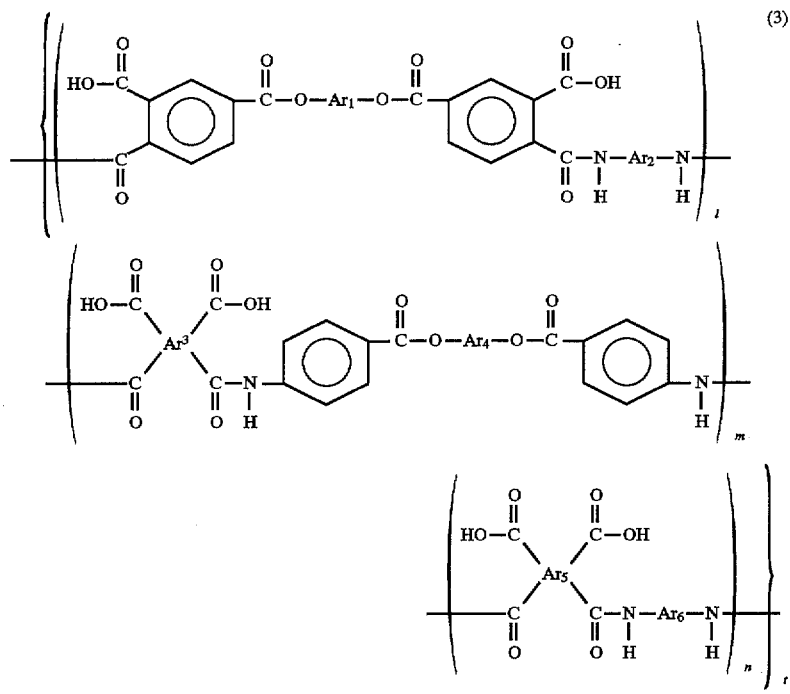

(3)

wherein, $Ar_1$, $Ar_2$, $Ar_4$, and $Ar_6$, respectively designate divalent organic radical, whereas $Ar_3$ and $Ar_5$ respectively designate quadrivalent organic radical, wherein l, m, and n, respectively designate positive integer 0 or 1 or more than 1, wherein the sum of l and m aggregates 1 or more than 1, and wherein t designates positive integer 1 or more than 1.

In particular, the novel polyamide acid is further represented by general formula (4) corresponding to the chemical structure shown below;

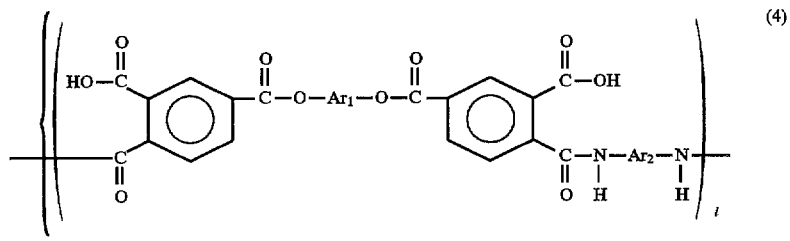

(4)

-continued

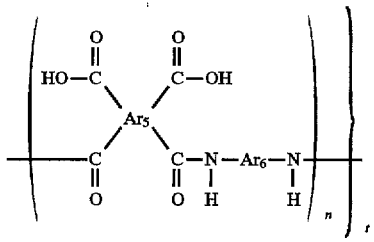

wherein, $Ar_1$, $Ar_2$, and $Ar_6$, respectively designate divalent organic radical, whereas $Ar_5$ designates quadrivalent organic radical, wherein l and t respectively designate positive integer 1 or more than 1, and wherein n designates positive integer 0 or 1 or more than 1.

Fundamentally, the novel thermally fusible laminated film suited for covering electric wires according to the invention features a novel structure in which polyimide film is laminated with layer of welding agents mainly comprising thermoplastic resin.

It is another feature of the thermoplastic resin of the novel thermally fusible laminated film suited for covering conductive wires according to the invention that the thermoplastic resin has a softening point of 220° C. or less, where the thermoplastic resin solely comprises the novel thermoplastic polyimide described earlier in any of the preceding sections.

Furthermore, it is another fundamental feature of the polyimide film that it comprises at least one kind of acidic dianhydrides corresponding to the chemical structure shown below;

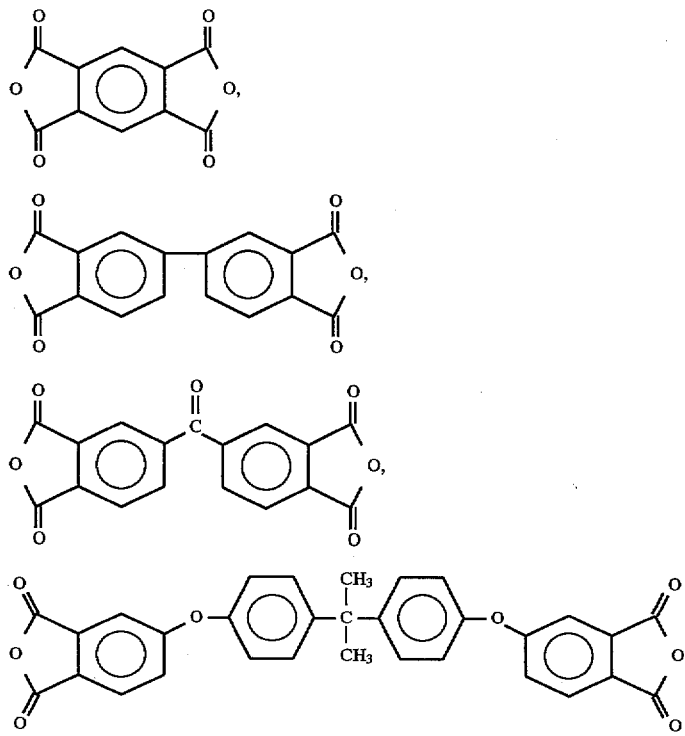

and at least one kind of diamines corresponding to the chemical structure shown below.

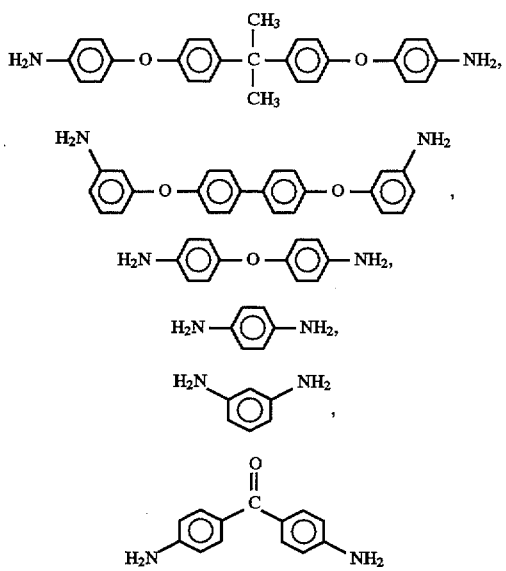

Substantially, the novel thermally fusible laminated film suited for covering conductive wires according to the invention comprises polyimide film, more particularly, it comprises novel polyimide film and layer of welding agent mainly comprising thermoplastic resin having a softening point of 220° C. or less in the laminated formation. Therefore, after winding the laminated film onto superconductive wires for example by way of disposing layer of welding agent inside, the superconductive wires enveloped by the laminated film are thermally treated at a certain temperature above the softening point of the layer of welding agent. Since applied temperature exceeds the softening point of the welding-agent layer, the layer of welding agent contained in the thermally fusible laminated film is fused with the superconductive wires when applied temperature exceeds a maximum of 220° C. of the soften point thereof. This in turn permits the internal wires to be free from adversely being affected by the thermal treatment, thus securely preventing the wires from incurring degradation. As mentioned above, the novel thermally fusible laminated film suited for covering conductive wires according to the invention is designed for providing the laminated film with surpassing physical properties in overall fields by laminating novel polyimide film featuring solid resistance against temperature, high performance characteristic under low temperature, durable resistance against chemicals, and distinct electric characteristic, with layer of welding agent featuring satisfactory softness, solid adhesive property and fusibility under low temperature. In particular, the novel thermally fusible laminated film is ideally suited for covering superconductive wires.

The novel thermoplastic polyimide represented by the above general formulas (1) and (2) materialized by the invention coincidentally incorporates surpassing thermoplasticity, solid adhesive property, low hygroscopic coefficient, and solid resistivity to radioactive rays. More particularly, owing to the novel composition, the thermoplastic polyimide according to the invention contains evident glass transition point between 100° C. and 250° C., and yet, since the thermoplastic polyimide can be bonded to copper foil directly by executing a laminating process at a certain temperature close to the glass transition point, the thermoplastic polyimide can be processed into film form suited for use while remaining in the state of polyimide. On the other hand, the novel polyamide acid represented by the above general formulas (3) and (4) and functioning as precursor of the thermoplastic polyimide can be transformed into imide component after directly being coated on the substrate film to easily form a film incorporating layer of adhesive agent. Furthermore, since the novel thermoplastic polyimide according to the invention exhibits extremely low hygroscopic coefficient approximately being 1%, a variety of physical properties including thermal resistance can be prevented from incurring degradation.

As is apparent from those advantages described above, unlike conventional adhesive agents based on epoxy resin, the novel thermoplastic polyimide and polyamide acid according to the invention have respectively materialized solid adhesive property under low temperature and solid resistivity to radioactive rays, and yet, by effectively transforming them into adhesive film, the invention provides an ideal thermoplastic polyimide composition.

Furthermore, since the novel thermally fusible laminated film ideally suited for covering conductive wires embodied by the invention is composed by laminating novel polyimide film featuring distinct physical properties such as thermal resistant property, performance characteristic under low temperature, chemical resistance, and electric characteristic, with layer of welding agent mainly comprising thermoplastic resin, when enveloping electric wires with the thermally fusible laminated film suited for covering wires according to the invention, the laminated film can thermally be fused with wires in a temperature range in which physical properties of wires can remain unaffected without degradation. Therefore, when covering superconductive wires with the inventive thermally fusible laminated film, the laminated film can fusibly envelop the objective wires without degrading superconductive characteristic proper to superconductive wires.

Furthermore, since the invented thermally fusible laminated film comprises layer of welding agent mainly consisting of thermoplastic resin, manufacturers can commercially distribute the laminated film comprising laminated layer of welding agent to facilitate the concerned to more readily deal with and process wires by making use of the novel laminated film to eventually promote productivity.

Furthermore, since the invention superficially uses insulated covering material comprising polyimide resin containing adhesive property with less than 220° C. of glass transition point among those thermoplastic polyimides represented by the above general formulas (1) and (2) and the layer of welding agent comprising polyimide, solid adhesive property under low temperature and distinct resistivity to radioactive rays can securely be materialized.

BRIEF DESCRIPTION OF THE DRAWINGS

FIG. 1 is an overall perspective view explanatory of a novel method of covering wires with the thermally fusible laminated film suited for covering wires embodied by the invention;

FIG. 2 is an overall perspective view explanatory of another novel method of covering wires with the thermally fusible film embodied by the invention; and FIG. 3 is an overall perspective view explanatory of another novel method of covering wires with the thermally fusible film embodied by the invention.

DETAILED DESCRIPTION OF THE INVENTION

In association with the production method, examples of thermoplastic polyimide, polyamide acid being precursor of the thermoplastic polyimide, and thermally fusible laminated film for covering wires embodied by the invention are respectively described below.

First, a method of producing polyamide acid solution being precursor of the thermoplastic polyimide according to the invention is described below. Initially, diamine represented by general formula (5) is dissolved or dispersed in organic solvent amidst inert gas atmosphere containing argon or nitrogen.

  (5)

wherein $Ar_7$ designates divalent organic radical.

Next, the diamine solution is added with ester-acid dianhydride represented by general formula (6) corresponding to the chemical structure shown below;

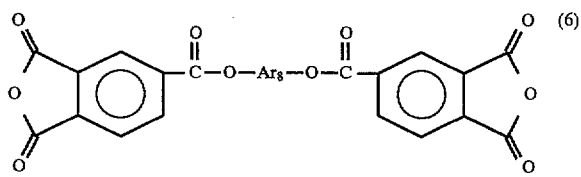  (6)

or the diamine solution is added with a mixture of ester-acid dianhydride and at least one kind of organic tetracarbonic acid dianhydride represented by general formula (7) corresponding to the chemical structure shown below;

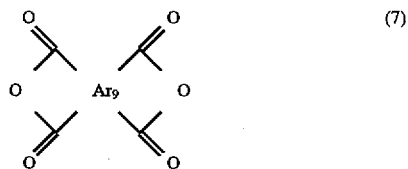  (7)

as of the state of solid content or in the form of solution dissolved in organic solvent, wherein $Ar_9$ shown in the general formula (7) designates quadrivalent organic radical. Finally, polyamide-acid solution being precursor of polyimide and represented by general formula (4) corresponding to the chemical structure shown below;

is produced.

wherein $Ar_1$, $Ar_2$, and $Ar_6$, respectively designate divalent organic radical, whereas $Ar_5$ designate quadrivalent organic radical, wherein n designates positive integer 0 or 1 or more than 1, and wherein 1 and t respectively designate positive integer 1 or more than 1.

Next, a method of producing polyamide acid solution being precursor of another thermoplastic polyimide according to the invention is described below. Initially, only ester diamine represented by general formula (8) corresponding to the chemical structure shown below;

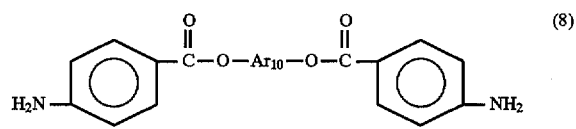  (8)

or mixture of ester diamine and at least one kind of diamine represented by the above general formula (5) is dissolved or dispersed in organic solvent amidst inert gas atmosphere containing argon or nitrogen.

wherein $Ar_{10}$ shown in the general formula (8) designates divalent organic radical. Next, the solution is added with ester-acid dianhydride represented by the above formula (6) or with mixture of ester-acid dianhydride and organic tetracarbonic acid dianhydride as of the state of solid content or in the form of solution dissolved in organic solvent. Finally, polyamide-acid solution being precursor of polyimide and represented by the general formula (3) corresponding to the chemical structure shown below;

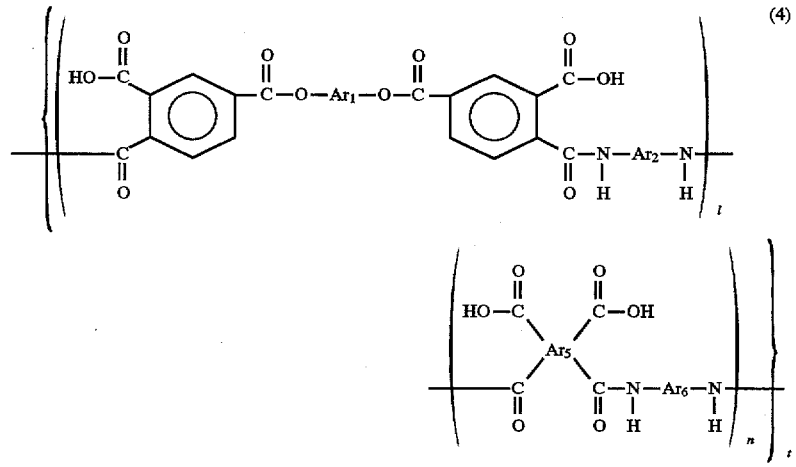  (4)

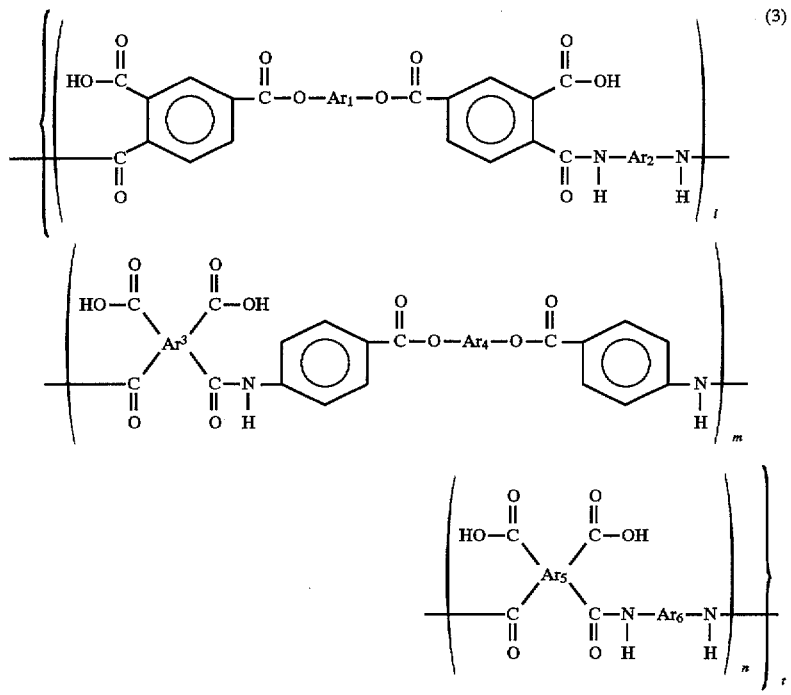

(3)

is produced.

wherein $Ar_1$, $Ar_2$, $Ar_4$, and $Ar_6$ shown in the general formula (3) respectively designate divalent organic radical, whereas $Ar_3$ and $Ar_5$ respectively designate quadrivalent organic radical, wherein l, m, and n, respectively designate positive integer 0 or 1 or more than 1, wherein the sum of l and m aggregates 1 or more than 1 and wherein t designates positive integer 1 or more than 1.

While reaction is underway, in the manner reversing the above processes, initially, solution containing only ester-acid dianhydride represented by the above general formula (7) or at least one kind of organic tetracarbonic acid dianhydride represented by the above general formula (8) or solution containing mixture of ester-acid dianhydride and organic tetracarbonic acid dianhydride is produced. The prepared solution may be added with either diamine represented by the above general formula (6), or only ester diamine represented by the above formula (5), or mixture of ester diamine and at least one kind of diamine represented by the above formula (6) as of the state of solid content or in the form of solution or slurry dissolved in organic solvent.

It is desired that reaction for the above processes be generated in a temperature range from −10° C. to a maximum of 50° C., and yet, it is more ideal that reaction be generated in a temperature range from −5° C. to a maximum of 20° C. Reaction is generated during a period corresponding to 0.5 through 6 hours. After reactions, polyamide polymer represented by the above general formulas (3) and (4) is generated as precursor of the thermoplastic polyimide embodied by the invention.

A variety of organic solvents may be used to generate reaction needed for producing polyamide acid polymerized solution, for example, including the following; sulfoxide solvent such as dimethyl sulfoxide or diethyl sulfoxide, formamide solvent such as N,N-dimethyl formamide or N,N-diethyl formamide,and acetoamide solvent such as N,N-dimethyl acetoamide or N,N-diethyl acetoamide, or the like. Any of these organic solvents may be used on the individual basis or by way of combining more than one of them as a blend organic solvent. Furthermore, any of those polar solvents may be mixed with polyamide acid non-solvent such as acetone, ethanol, isopropanol, benzene methylcellosolve, or the like, to make up blend solvent.

In order to produce polyimide from polyamide polymerized solution being precursor of thermoplastic polyimide, it is essential that the polyamide polymerized solution be produced by thermally and/or chemically transforming it into imide. Next, method of dehydrating and closing cyclic component of polyamide-acid polymerized solution, in other words, method of imidizing the polyamide-acid polymer solution, is described below.

Based on a thermal treatment, polyamide-acid polymerized solution is imidized via sequential processes described below. Initially, the solution is spread or coated on a supporting body such as an organic film made from PET, or a drum, or an endless belt. After being transformed into a film, the filmed content is dried so that self-supporting property can be generated. It is desired that the drying process be executed at a certain temperature below 100° C. for about 5 through 90 minutes.

The dried film is further heated until fully being transformed into imide to complete polyimide film comprising thermoplastic polyimide embodied by the invention. It is desired that the film be heated at a temperature ranging from 100° C. to a maximum of 350° C., preferably between 150° C. and 300° C. Although no restriction applies to the rate of raising temperature, it is desired that temperature be gradually raised until reaching the maximum degree suggested above. Duration of the heating process depends on thickness of the film and maximum temperature applicable to the film. However, it is desired that the heating process be held on for 10 seconds up to a maximum of 30 minutes after reaching the maximum degree. Initially, the film itself is stripped off from the supporting body, and then, while securing edges of the stripped film, the final heating process mentioned above is executed. As a result, the yielded polymer exhibits extremely low linear expansion coefficient.

In order to chemically imidize polyamide acid polymerized solution, initially, selected dehydrate and catalytic tertiary amine are added to polyamide acid polymerized solution by a certain amount exceeding stoichiometric calculation, and then, the mixed solution is treated by applying the same method as was executed for thermal dehydration process, and finally, desired polyimide film is produced.

Comparison between the thermal and chemical treatments executed for imidizing polyamide acid polymerized solution indicates that higher mechanical strength and lower linear expansion coefficient are evidently generated in the polyimide produced via the chemical treatment. However, the invention can also be embodied by combining both the thermal and chemical treatments.

After completing the process for imidizing polyamide acid polymer represented by the above general formula (3), the novel polyimide composition represented by the general formula (1) corresponding to the chemical structure shown below;

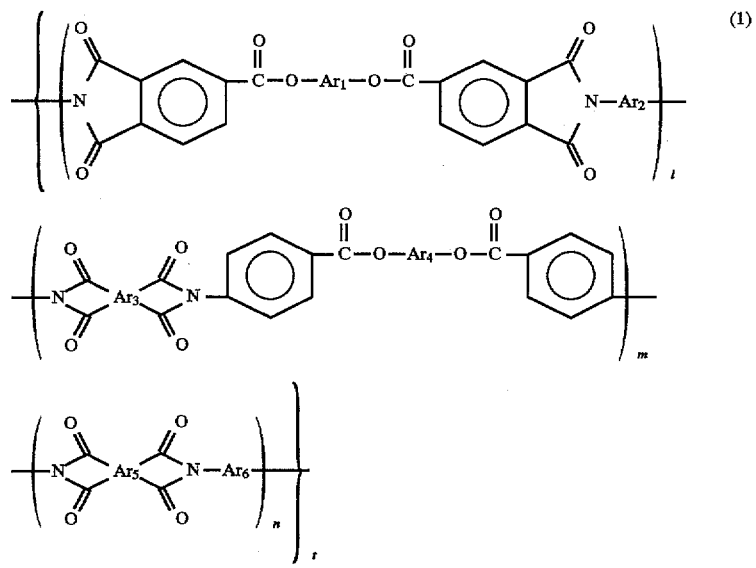

(1)

is produced, wherein $Ar_1$, $Ar_2$, $Ar_4$, and $Ar_6$, respectively designate divalent organic radical, whereas $Ar_3$ and $Ar_5$ respectively designate quadrivalent organic radical, wherein l, m, and n, respectively designate positive integer 0 or 1 or more than 1, wherein the sum of l and m aggregates 1 or more than 1, and wherein t designates positive integer 1 or more than 1.

In order to provide ester-acid dianhydride represented by the above general formula (6), generally, any of ester-acid dianhydrides selected from glycol group or phenol group may be used. Concretely, radical $A_8$ shown in the above general formula (6) is represented by the chemical structure shown below.

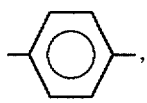

-continued

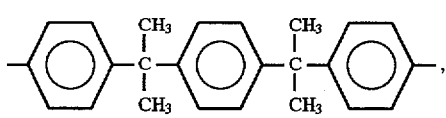

n = 2~9 ,

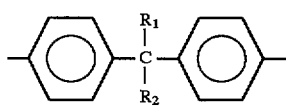

$R_1$, $R_2$ = H, $CH_3$, $CH_2CH_3$, Ph,

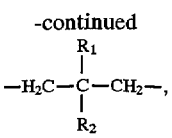

$R_1, R_2 = H, CH_3,$
$CH_2CH_3, Ph$

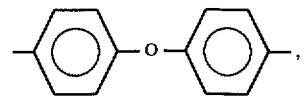

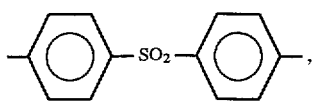

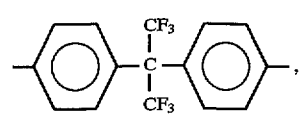

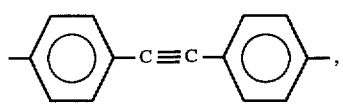

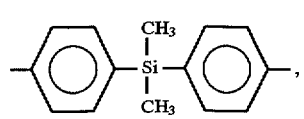

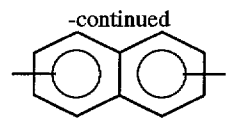

Concretely, in order to proportionate physical properties, it is desired that radical $A_8$ be mainly composed of the chemical structure shown below.

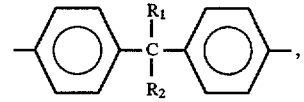

$R_1, R_2 = H, CH_3, CH_2CH_3, Ph,$

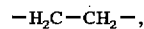

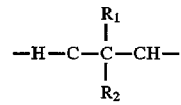

$R_1, R_2 = H, CH_3, CH_2CH_3, Ph,$

In order to provide organic tetracarbonic acid dianhydrides, any of organic tetracarbonic acid dianhydrides may be used. Radical $A_9$ shown in the above general formula (7) designates quadrivalent organic radical and is concretely represented by the chemical structure shown below.

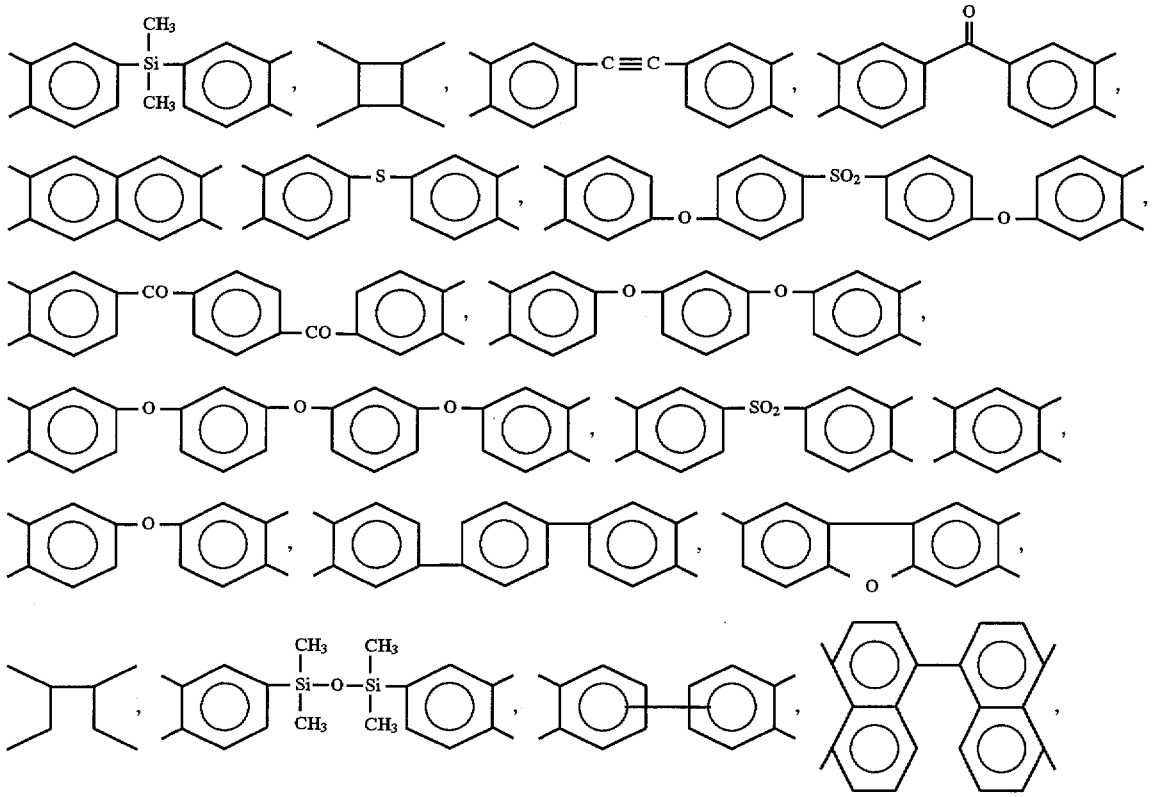

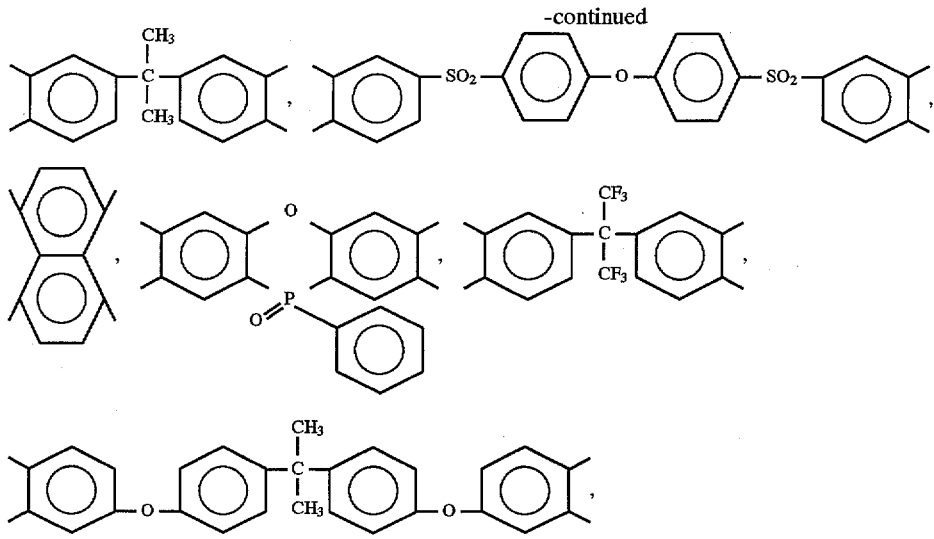

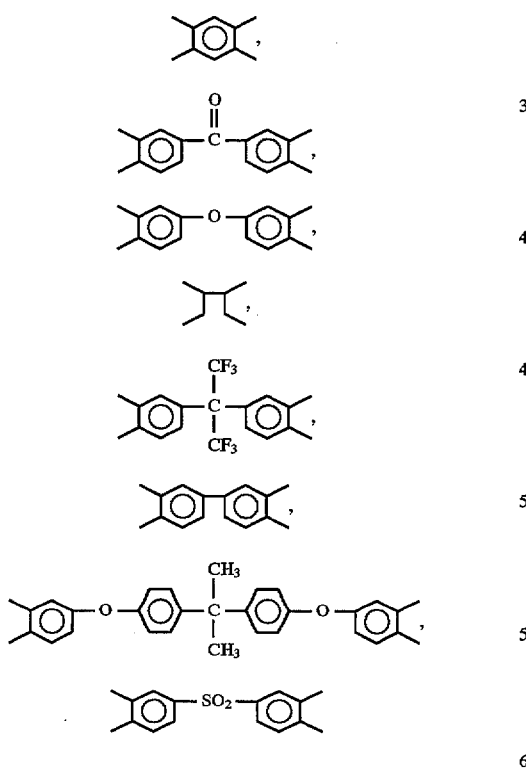

Any of organic tetracarbonic acid dianhydrides may be used on the individual basis or by way of combining plural kinds of them. More particularly, in order to proportionate physical properties, it is desired that radical $Ar_9$ be mainly composed of at least more than one kind of organic tetracarbonic acid dianhydride represented by the chemical structure shown below.

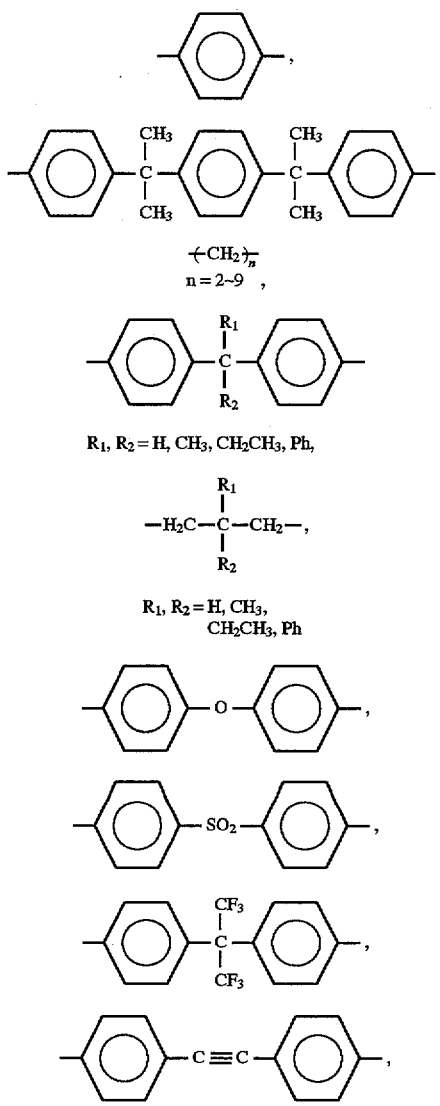

To provide ester diamine represented by the above general formula (8) for embodying the invention, any ester diamines selected from glycol group or phenol group may be used. Concretely, radical $Ar_{10}$ shown in the above general formula (8) is represented by the chemical structure shown below.

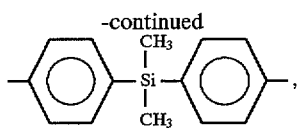

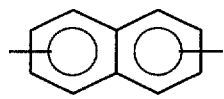

More particularly, in order to proportionate physical properties, it is desired that radical $Ar_{10}$ be mainly composed of the chemical structure shown below.

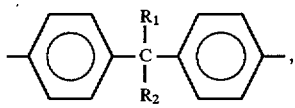

$R_1, R_2 = H, CH_3, CH_2CH_3, Ph,$ $-H_2C-CH_2-,$

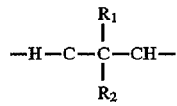

$R_1, R_2 = H, CH_3, CH_2CH_3, Ph,$

In sofar as $A_7$ of diamine compound represented by the above general formula (5) substantially comprises divalent organic radical, any kind of $Ar_7$ may be used. Concretely, chemical structures shown below;

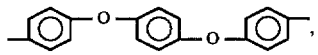

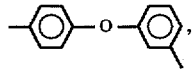

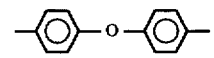

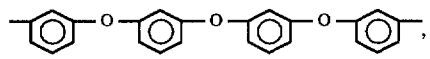

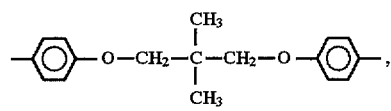

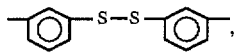

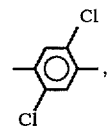

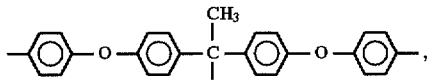

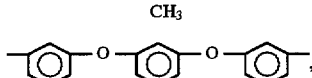

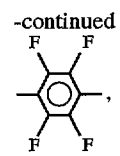

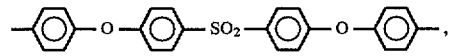

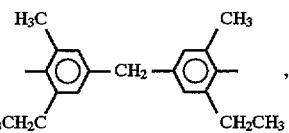

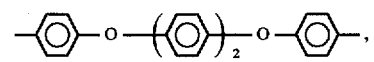

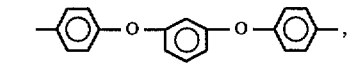

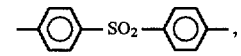

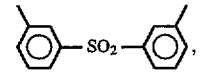

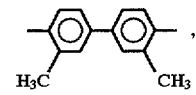

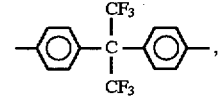

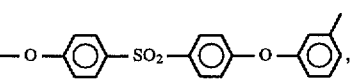

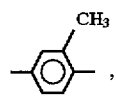

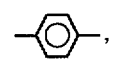

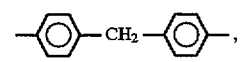

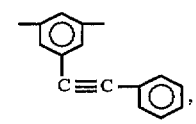

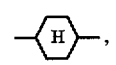

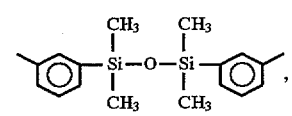

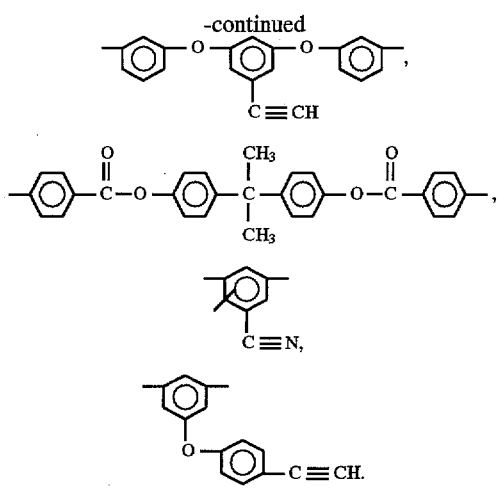

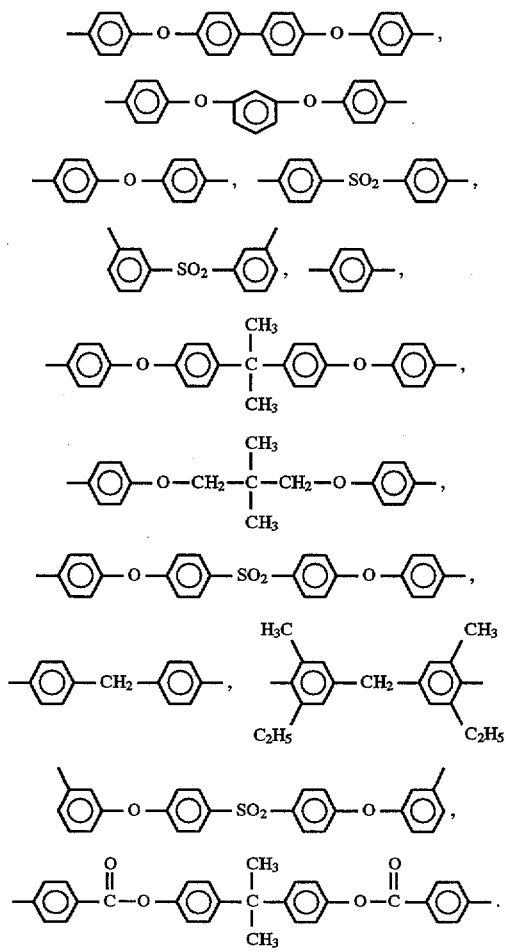

The above general formula (1) represents repeatable number l, m, and n, on the block basis contained in the novel thermoplastic polyimide, where the repeatable numbers l, m, and n, respectively designate positive integer 0 or greater than 0, and yet, sum of l and m aggregates 1 or more than 1. In particular, it is desired that the repeatable numbers l, m, and n, respectively be 15 or less than 15. This is because, if the repeatable number n ever exceeds 15 times the sum of the repeating numbers l and m, it will result in the biased copolymerization ratio to decrease practical effect of polymerization. More particularly, it is because adhesive property under low temperature can not easily be materialized. Polymer may contain such a unit having different values of the repeatable numbers l, m, and n. However, it is particularly desired that values of the repeatable numbers l, m, and m, respectively remain constant.

Desirably, repeatable number t on the block basis shall be of positive integer 1 or more than 1. Although no restriction applies to the molecular weight of the novel thermoplastic polyimide, in order to retain proper strength of produced polyimide, it is desired that mean molecular weight be more than 10000 on the numerical basis.

Incidentally, in many cases, difficulty involves in the direct measurement of molecular weight of polyimide polymer. To solve this problem, based on inference, molecular weight of polyimide polymer is indirectly measured. For example, when synthesizing polyimide polymer for producing polyamide acid, molecular weight of polyimide is determinable based on a certain value corresponding to molecular weight of polyamide acid.

Even in the case of the novel polyamide acid polymer represented by the above general formulas (3), it is desired that the repeatable numbers l, m, and n, on the block basis respectively be of positive integer 0 or more than 0, and yet, sum of l and m be 1 or more than 1. In particular, it is desired that each of the repeatable numbers l, m, and n, be less than 15. Individual molecule of polymer may contain such a unit having different values of the repeatable numbers l, m, and n. However, it is particularly desired that values of the repeatable numbers l, m, and n, respectively remain constant. Desirably, the repeatable number t on the block basis be of positive integer 1 or more than 1.

The novel polyimide according to the invention coincidentally incorporates distinct thermoplastic property, solid adhesive property under low temperature, low hygroscopic coefficient, and solid resistivity to radioactive rays. More particularly, owing to the novel composition, the polyimide according to the invention has evident glass transition point between 100° C. and 250° C. The novel polyimide can be adhered to polyimide film directly when being laminated thereon at a certain temperature close to the glass transition point. It is evidenced via test that the novel polyimide according to the invention exhibits quite low hygroscopic coefficient merely rated to be 1% after being immersed in pure water at 20° C. for 24 hours, and yet, it exhibits extremely high resistivity to radioactive rays.

Therefore, the invention facilitates the concerned to transform the novel thermoplastic polyimide into film. This in turn permits the concerned to solidly adhere copper foil to a flexible printed wiring board made of the novel thermoplastic polyimide film by deleting adhesive agent. When executing an adhesion process, copper foil may be bonded to either of both surfaces by adhering an exfoliatable sheet onto the other surface. The novel polyimide film is particularly suited for the substrate of multilayer printed wiring boards for example.

Furthermore, the novel thermoplastic polyimide film embodied by the invention is also applicable as adhesive agent for use with such a film devoid of own adhesive property. In this case, since the novel thermoplastic polyimide film can be supplied in the state of polyimide film, it can easily be handled. For example, the polyamide acid embodied by the invention may directly be applied to conventional base film via coating. After completing the imidizing process, a novel film incorporating an adhesive agent layer can be offered for use. Although the polyamide acid embodied by the invention is offerable for a variety of uses, there is no particular restriction on the use.

Since the novel thermoplastic polyimide has a variety of distinct features as described above, the invention can provide a novel thermally fusible laminated film suited for covering wires by laminating the novel polyimide film with layer of welding agent mainly comprising thermoplastic polyimide resin.

According to the invention, a variety of thermoplastic resins may be used for composing the thermally fusible laminated film suited for covering wires on the individual basis or by way of mixing plural kinds of thermoplastic resin, for example, including the following; polyimide resin containing adhesive property like the one specified above, polyamide resin, polyester resin, polyethylene resin, butyral resin, polyurethane resin, polyether-imide resin, or the like. However, in order to proportionate physical properties, it is preferred that the thermoplastic polyimide resin according to the invention be used. When using the thermally fusible laminated film suited for covering wires materialized by the invention for thermal fusion with superconductive wires for example, in order to prevent superconductive wires from incurring degradation, it is preferred that softening point of the used thermoplastic resin be less than about 145° C.

It is essential that the layer of welding agent incorporates and mainly comprises the above-defined thermoplastic resin. However, the layer of welding agent may additionally contain other component material such as inorganic filler for example.

The layer of welding agent according to the invention is precisely formed in order that total thickness can remain in a range from 1 μm to a maximum of 50 μm, preferably in a range from 5 μm to a maximum of 20 μm. If the total thickness of the layer of welding agent ever exceeds the defined range, then, it will not only cause the layer of welding agent to protrude from the edges of the polyimide film base when being fused with each other, but it will also obstruct the novel polyimide film to fully exert distinct physical properties. On the other hand, if total thickness of the layer of welding agent were short of the above-defined range, then adhesion will not fully be exerted.

The novel polyimide film embodied by the invention is produced by initially molding dissolved polyamide acid into film followed by a process to dehydrate and close cyclic components, where the dissolved polyamide acid is produced via polymerizing reaction generated between a variety of acid anhydride components such as pyromellitic acid dianhydride, biphenyl tetracarbonic acid dianhydride, benzophenone tetracarbonic acid dianhydride, or the like, and a variety of diamine components such as diaminodiphenyl ether, paraphenylene diamine, or bis(aminophenoxyphenyl) propane, for example.

In addition, quasi-imide product such as polyamidimide, polyether imide, may also be used. The polyimide film embodied by the invention is based on a concept inclusive of the quasiimide products as well. It is desired that the polyimide film be composed of polyimide. In particular, it is preferred that the polyimide film according to the invention comprises at least more than one kind of acid dianhydride represented by the chemical structure shown below;

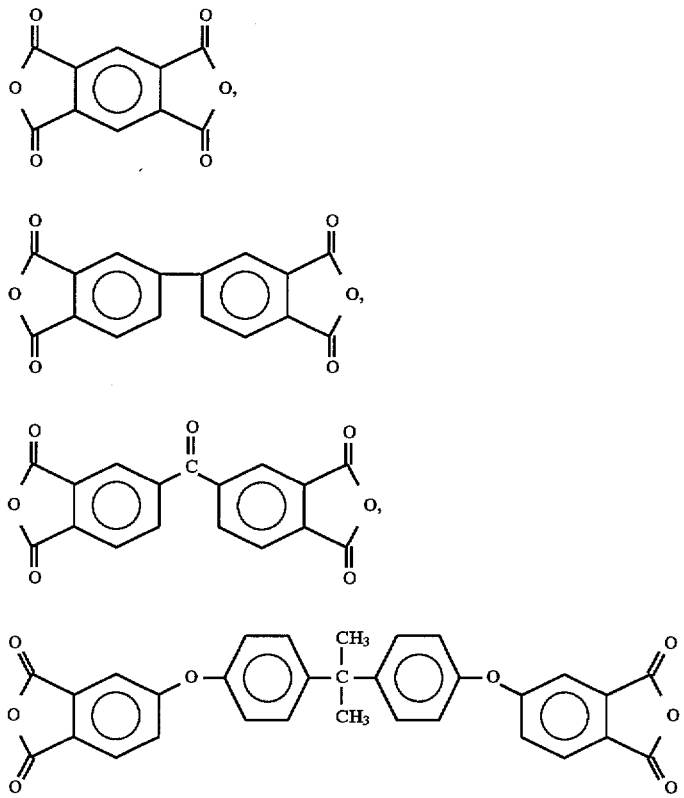

and at least more than one kind of diamine represented by the chemical structure shown below.

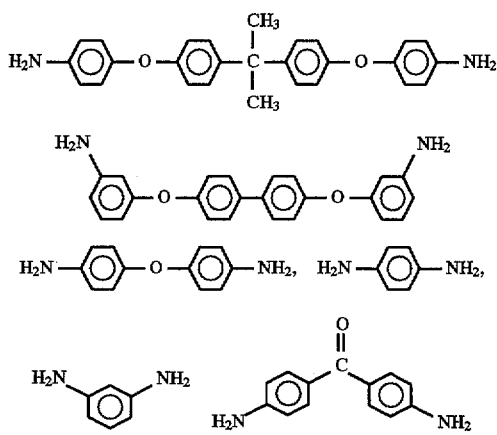

Thickness of usable polyimide film ranges from 5 μm to a maximum of 150 μm. Preferable range of the polyimide is practically from 10 μm to 125 μm. In particular, when covering wires with polyimide films, it is preferred that each polyimide film be provided with 10 μm through 75 μm of thickness. If the thickness were below the defined range, it will not only generate difficulty to compose a laminated body, but it will also cause the laminated film to easily incur unwanted break during service. On the other hand, if the thickness were in excess of the defined range, then, the laminated film can hardly be wound onto the objective wire.

The novel thermally fusible laminated film suited for covering wires embodied by the invention is composed by laminating novel polyimide film with layer of welding agent mainly comprising thermoplastic resin. The layer of welding agent of the thermally fusible laminated film having laminated structure can be formed by initially coating surface of polyimide film with thermoplastic resin previously dissolved in solvent followed by execution of a drying process.

Practically, after coating the polyimide film with thermoplastic resin dissolved in solvent by a predetermined thickness, a drying process is executed in order that the actual thickness of the dried object can correspond to the actual thickness of the layer of welding agent. For example, the thermally fusible laminated film can be produced by imidizing solution of polyamide acid being precursor of polyimide resin containing adhesive property after completing a preceding process to spread the polyamide acid solution all over the polyimide film. As another method of forming the layer of welding agent, thermally fusible resin previously transformed into film on a supporting substrate is laminated on the polyimide film. Concretely, the thermally fusible laminated film suited for covering wire is also produced by executing those sequential steps described below. For example, initially, the polyimide film, the polyimide resin containing adhesive property and previously formed into film, and an exfoliatable sheet are laminated in sequence, and then, the laminated components are thermally compressed to effect adhesion, and finally, the exfoliatable sheet is stripped off to complete the thermally fusible laminated film suited for covering wire.

The produced thermally fusible laminated film according to the invention is wound up, or the produced laminated film is accommodated with a film-form spacer made from polyethylene terephthalate, polypropylene, or polyethylene, on the part of the layer of welding agent of the laminated film before being wound up. The thermally fusible laminated film according to the invention is arranged into predetermined width before actually being offered for covering wires.

Normally, the process for covering wires with the novel thermally fusible laminated film embodied by the invention is executed as described below. For example, as shown in FIG. 1, initially, the thermally fusible laminated film 10 arranged by a predetermined width is spirally wound onto external circumferential surface of a wire 12 by way of overlapping both ends of the laminated film 10. Next, the laminated film 10 is heated up to a predetermined degree to dissolve the layer of welding agent to thermally fuse the polyimide film 16 with the objective wire 12. Furthermore, as shown in FIG. 2, the laminated film 10 may also be wound onto the wire 12 by way of bringing both ends of the wound laminated film 10 into contact with each other without overlapping themselves. In addition, as shown in FIG. 3, according to another method, width of the laminated film 10 is arranged to be slightly wider than the external circumference of the objective wire 12 so that the laminated film 10 can be wound along the wire 12. Although any of these methods is practicable, it is most preferable to have the laminated film 10 wound onto the objective wire based on the method shown in FIG. 1.

Full details of the novel thermoplastic polyimide, polyamide acid, and the novel thermally fusible laminated film suited for covering wire, have thus been described. It should be understood however that the scope of the invention is by no means merely confined to those typical embodiments described above, but for example, superconductive wires may be a covering object, or covering object may include conventional wires such as copper wire or any optional wires as well. The invention is applicable to extensive aspects added with a variety of improvements, variations, and modifications, based on knowledges of those skilled in the art within the scope that does not deviate from the fundamentals of the invention.

Next, actual examples of the invention are more fully described below. However, the scope of the invention is not solely confined to the following examples.

EXAMPLE 1

Initially, 1.0 gram of ethylene glycol bis-trimellitic acid dianhydride (hereinafter merely referred to as TMEG) and 10.0 grams of dimethyl formamide (hereinafter referred to as DMF) were mixed in a 50 ml-capacity mess flask, and then the mixture was stirred with a stirrer until fully being dissolved. Independent of this sample, 22.7 grams of 2,2-bis(4-aminobenzyl oxyphenol) propane (hereinafter merely referred to as BA-BPP) and 68.1 grams of DMF were mixed in a 500 ml-capacity three necked flask attached with a stirrer, and then, the mixture was stirred while replacing atmosphere in the flask with nitrogen until the mixture was fully dissolved. Next, 19.0 grams of TMEG was added in a 100 ml-capacity mess flask, and then, TMEG was added to solution of BABPP. Next, using 21.5 grams of DMF, residual ingredient of TMEG adhered to inner wall surface of the 100 ml-capacity mess flask was transferred into a three necked flask. After stirring the blend solution for about an hour, the other sample solution of TMEG stored in the 50 ml capacity mess flask was gradually added to the three-necked flask while surveying actual viscosity of the solution in the three-necked flask. After confirming that the solution in the three-necked flask reached maximum viscosity, injection of the prepared solution of TMEG was terminated. The blended solution was stirred for an hour, and finally, polyamide acid solution was yielded.

The yielded polyamide acid solution was then transformed into film by executing the method described below.

Next, the polyamide acid solution was imidized before a laminated film was eventually produced. Inventors analyzed physical proper ties of the laminated film. Initially, 2.0 grams of isoquinoline and 20.0 grams of acetic acid anhydride were poured into a 100 ml-capacity mess flask, and then the mixture was stirred well. Next, this sample solution was added to the produced polyamide solution, and then the mixed solution was stirred well. After fully removing air, the mixed component was coated on a PET film. The PET film coated with the mixed component was then heated at 80° C. for 25 minutes. Next, the PET film was stripped off, and then temperature was gradually raised from 150° C. to 200° C. at which the mixed component was heated for 10 minutes so that it could be imidized to eventually generate thermoplastic polyimide in film form. Finally, inventors measured glass transition point (° C.) and hygroscopic coefficient (%) of the produced thermoplastic polyimide. It was confirmed via TMA method that the produced thermoplastic polyimide exhibited 122° C. of glass transition point and also confirmed via ASTM D-570 method that it merely exhibited 0.95% of hygroscopic coefficient. Test results are shown in Table 1.

TABLE 1

|  | glass transition point (°C.) | peeling strength (kg/cm) | hygroscopic coefficient (%) |
| --- | --- | --- | --- |
| Example 1 | 122 | 1.4 | 0.95 |
| Example 2 | 130 | 2.0 | 1.13 |
| Example 3 | 222 | 2.0 | 1.13 |
| Example 4 | 185 | 1.6 | 1.45 |
| Comp. Example 1 | 238 | not adhered | 1.98 |
| Comp. Example 2 | 178 | not adhered | 1.98 |

Next, a polyimide film "APICAL" (a product and a registered trade name of Kanegafuchi Chemical Industry Co., Ltd. ), the produced thermoplastic polyimide in film form, and an exfoliatable sheet, were superposed in sequence. These components were then laminated together at 150° C. and 2.2 cm per minute of laminating speed before the thermally fusible laminated film suited for covering wire was eventually completed. After stripping off the exfoliatable sheet from the completed laminated film, a copper foil was laid on the film surface, and then, the copper foil was adhered onto the film surface at 150° C. and 2.2 cm per minute of adhering speed, and finally, a copper-foil laminated film was completed.

Inventors then measured peeling strength (kg/cm) of the completed copper-foil laminated film as per JIS-K6481 test method at room temperature, and then evaluated the peeling strength to be 1.4 kg/cm. Test result is shown in Table 1. In addition, using electronic wires containing 2 MeV of capacity, inventors evaluated resistivity to radioactive rays by irradiating the copper-foil laminated film with 5 MGy rays. In consequence, neither discoloration of the copper-foil laminated film nor degradation of the built-in material was evidenced as a result of the execution of radioactive-resistance test.

EXAMPLE 2

Except for the introduction of 1,3-bis(4-amino-phenoxy)-2,2-dimethylpropane by 13.3 grams in place of BABPP, in the same way as was done for the Example 1, inventors produced thermoplastic polyimide in the film form. Then, in the same way as was done for the Example 1, inventors produced the thermally fusible laminated film suited for covering wires, and finally produced copper-foil laminated films.

As was done for the Example 1, glass transition point and hygroscopic coefficient of the produced thermoplastic polyimide were respectively measured. It was confirmed that the thermoplastic polyimide exhibited 130° C. of glass transition point and 1.13% of hygroscopic coefficient.

Furthermore, peeling strength of the produced copper foil laminated film was rated to be 2.0 kg/cm. Result is shown in Table 1. Furthermore, using electronic wires having 2 MeV of capacity, by irradiating the copper-foil laminated film with 5 MGy of radioactive rays, resistivity to radioactive rays was checked. Test result evidenced that neither discoloration of the copper foil laminated film nor degradation of the built-in material occurred.

EXAMPLE 3

Initially, 16.9 grams of 2,2-bis[4-(4-aminophenoxy) phenyl] propane (hereinafter merely referred to as BAPP) and 25.4 grams of dimethylformamide (DMF) were conjunctionally mixed in a 500 ml-capacity mess flask 1, and then the mixture was stirred with a stirrer until fully being dissolved. In addition, 1.0 grams of BAPP and 10 grams of DMF were also mixed in another 50 ml-capacity mess flask 2, and then the mixture was stirred until fully being dissolved. Independent of these, 11.9 grams of 2,2-bis(4-hydroxyphenyl) propane dibenzoate-2,2',3,3'-tetracarboxylic acid dianhydride (hereinafter merely refer to as ESDA), 4.5 grams of pyrometric acid dianhydride (PMDA), and 25 grams of DMF, were conjunctionally mixed in a 500 ml capacity three-necked flask attached with a stirrer, and then, while cooling off the mixture with ice water, and yet, while replacing atmosphere in the 500 ml three-necked flask with nitrogen, the mixture was fully dissolved.

Next, while stirring solution of BAPP previously stored in the 50 ml-capacity mess flask 1, the BAPP solution was quickly poured into the 500 ml-capacity three-necked flask. After stirring the blend solution for about 30 minutes, while surveying viscosity of the blend solution in the 500 ml-capacity three-necked flask, the BAPP solution stored in the 50 ml capacity flask 2 was gradually transferred to the 500 ml-capacity three-necked flask. After reaching maximum viscosity, transfer of the BAPP solution from the 50 ml-capacity mess flask 2 into the 500 ml-capacity three-necked flask was terminated. Then, the mixed solution was stirred for an hour. Next, 78.2 grams of DMF was added to the mixed solution, and then, the blend solution was fully stirred before the objective polyamide acid solution was eventually yielded.

The yielded polyamide acid solution was spread on a PET film via coating, and then, the coated solution was heated at 80° C. for 25 minutes. Then, heated polyamide acid component was dried until generating self-supporting property. Next, the dried polyamide acid film was stripped off from the PET film and then secured onto a metallic supporting base. Then, the polyamide acid film was thermally treated based on sequential heating stages at 150° C., 200° C., 250° C., and 300° C., for 5 minutes per stage. Next, the thermally treated polyamide acid film was imidized before eventually being transformed into thermoplastic polyimide film. Next, a conventional polyimide film "APICAL" (a product and a trade name of Kanegafuchi Chemical Industry Co., Ltd. ), the thermoplastic polyimide film produced by execution of the above sequential processes, and a copper foil having 35 µm of thickness, were superposed in sequence. These components were then laminated at 300° C. and at 2.2 cm/minute of processing speed. Finally, a copper-foil laminated film was completed.

Next, in the same way as was done for the Example 1, inventors measured glass transition point and hygroscopic coefficient of the thermoplastic polyimide yielded via the above process, and then rated the glass transition point to be 222° C. and the hygroscopic coefficient to be 1.13%. Next, as was done for the Example 1, peeling strength of the produced copper-foil laminated film was measured, which was then rated to be 2.0 kg/cm. Result is shown in Table 1. Then, using electronic wires having 2 MeV of capacity, the copper-foil laminated film was irradiated by 5 MGy of radioactive rays to check resistivity to these rays. The result evidenced that neither discoloration occurred in the copper-foil laminated film nor degradation took place in the built-in material.

EXAMPLE 4

Initially, copolymerization was executed by adding 30 grams of DMF, 22.7 grams of BABPP, and 10.6 grams of PMDA, to the polyamide acid polymerized solution produced by execution of Example 1, and then the final polyamide acid polymerized solution was yielded. Next, in the same way as was done for the Example 1, the yielded polyamide acid polymerized solution was imidized before producing thermoplastic polyimide in film form. Then, as was done for the Example 1, thermally fusible laminated film suited for covering wire was produced before eventually completing a copper-foil laminated film.

In the same way as was done for the Example 1, glass transition point and hygroscopic coefficient were measured. As a result, the copper-foil laminated film exhibited 185° C. of glass transition point and 1.45% of hygroscopic coefficient. Furthermore, as was done for the Example 1, peeling strength of the copper-foil laminated film was measured, which was then rated to be 1.6 kg/cm. Next, using electronic wires having 2 MeV of capacity, the copper-foil laminated film was irradiated by 5 MGy of radioactive rays to check resistivity against it. Test result evidenced that neither discoloration occurred in the copper-foil laminated film nor degradation took place in the built-in material.

COMPARATIVE EXAMPLE 1

Comparative examples were based on thermoplastic polyimide containing BTDA and BAPP. Initially, 1.94 gram of 3,3',4,4'-benzophenone tetracarboxylic dianhydride (BTDA) and 30 grams of DMF were mixed in a 50 ml-capacity mess flask, and then the mixture was fully dissolved. Independently, 51.8 grams of BAPP and 310 grams of DMF were conjunctionally mixed in a 500 ml capacity three-necked flask attached with a stirrer. While cooling off the mixture with ice water, and yet, while replacing atmosphere in the flask with nitrogen, the mixture was stirred until fully being dissolved. Next, 38.8 grams of solid BTDA was added to a 100 ml-capacity mess flask, and then the solid BTDA was added to the BAPP solution. Next, using 10.0 grams of DMF, residual BTDA adhered to wall surface of the 100 ml-capacity mess flask was transferred into the 500 ml capacity three-necked flask. After stirring the mixture for about 30 minutes, while surveying viscosity of the blend solution in the 500 ml-capacity three-necked flask, BTDA solution was gradually transferred from the 50 ml-capacity mess flask into the 50 ml-capacity three-necked flask. After arriving at maximum viscosity, injection of the BTDA solution was terminated. The blend solution was then stirred for an hour, and finally, polyamide acid solution was yielded. Next, a conventional polyimide film "APICAL" (a product and a trade name of Kanegafuchi Chemical Industry Co., Ltd.), the thermoplastic polyimide polymerized film produced by execution of the above processes, and a copper foil having 35 μm of thickness, were superposed in sequence, then then, these components were thermally laminated at 300° C. and at 2.2 cm/minute of processing speed. Finally, a copper-foil laminated film was completed.

Next, as was done for the Example 1, glass transition point and hygroscopic coefficient of the completed copper-foil laminated film were evaluated. As a result, glass transition point was rated to be 238° C. and hygroscopic coefficient to be 1.98%. Although peeling strength was checked in the same way as was done for the Example 1, since no adhesive process was executed against the copper-foil laminated film, no result was generated on the peeling strength. Evaluated results are presented in Table 1. In addition, using electronic wires having 2 MeV of capacity, the produced copper-foil laminated film was irradiated by 5 MGy of radioactive rays to check resistivity against it. Test result evidenced that neither discoloration occurred in the copper-foil laminated film nor degradation took place in the built-in material.

COMPARATIVE EXAMPLE 2

In place of the thermoplastic polyimide embodied by the invention, a conventional epoxy-resin based adhesive agent "EPICOAT" 828 (a product and a trade name of TUKA-Shell Co., Ltd.) was used for producing a copper-foil laminated film by applying the method identical to that was executed for the Example 1.

After analyzing physical property of the produced copper-foil laminated film in the same way as was done for the Example 1, the epoxy adhesive agent exhibited 178° C. of glass transition point and 1.98% of hygroscopic coefficient. In addition, as was done for the Example 1, peeling strength of the produced copper-foil laminated film was checked. However, because of no adhesive process executed for the laminated film, no result was generated on the peeling strength. Evaluated results are shown in Table 1. After irradiating the produced copper-foil laminated film with 5 MGy of radioactive rays to check resistivity against it, the copper-foil laminated film based on the above component turned into black shade.

What is claimed is:

1. Thermoplastic polyimide represented by following formula (1);

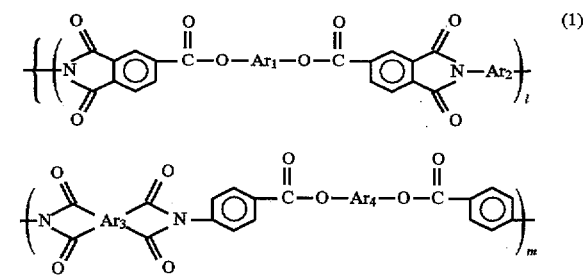

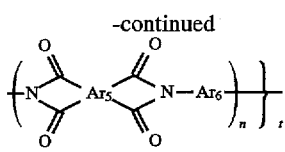

wherein $Ar_1$, $Ar_2$, $Ar_4$, and $Ar_6$ respectively designate divalent organic radical, $Ar_3$ and $Ar_5$ respectively designate quadrivalent organic radical, l, m, and n, respectively designate a positive integer of 0 or 1 or more than 1, the sum of l and m is equal to 1 or more than 1, and t designates a positive integer 1 or more than 1.

2. The thermoplastic polyimide as defined in claim 1, wherein said $Ar_1$ comprises at least one radical selected from the group of divalent organic radicals as follows:

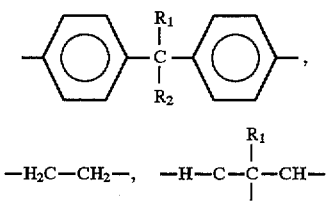

$R_1$, $R_2$ = H, $CH_3$, $CH_2CH_3$, Ph, or $R_1$, $R_2$ = H, $CH_3$, $CH_2CH_3$, Ph, and wherein $R_1$ and $R_2$ are each independently selected from the group consisting of H, $CH_3$, $CH_2Ch_3$ and Ph.

3. The thermoplastic polyimide as defined in claim 1 or 2, wherein said $Ar_2$ comprises at least one radical selected from the group of divalent aromatic radicals as follows

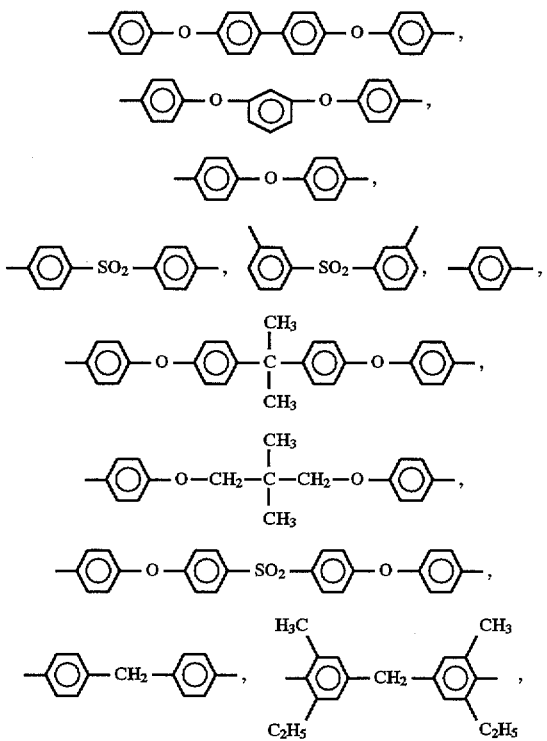

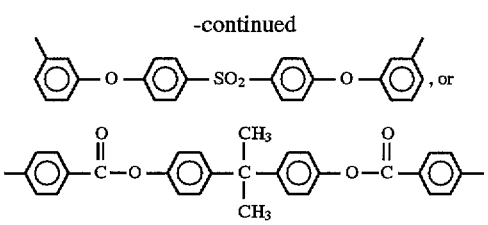

4. The thermoplastic polyimide as defined in claim 1, wherein said $Ar_3$ comprises at least one radical selected from the group consisting of quadrivalent organic radicals as follows:

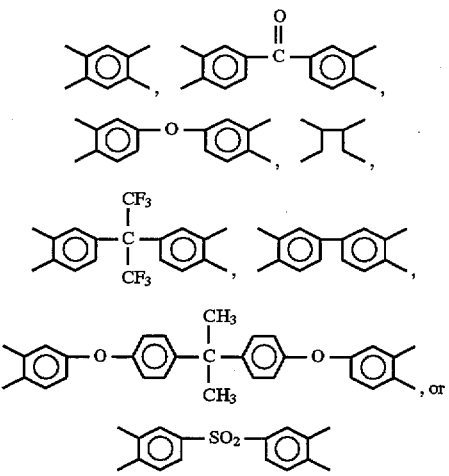

5. The thermoplastic polyimide as defined in claim 1, wherein said $Ar_4$ comprises at least one radical selected from the group of divalent organic radicals as follows:

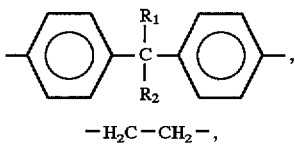

$-H_2C-CH_2-$,

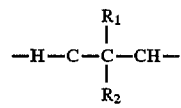

$R_1$, $R_2$ = H, $CH_3$, $CH_2CH_3$, Ph, or $R_1$, $R_2$ = H, $CH_3$, $CH_2CH_3$, Ph and wherein $R_1$ and $R_2$ are each independently selected from the group consisting of H, $CH_3$, $CH_2Ch_3$ and Ph.

6. The thermoplastic polyimide as defined in claim 1, wherein said $Ar_5$ shown in the above general formula (1) comprises at least one radical selected from the group of quadrivalent organic radicals as follows:

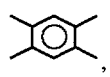

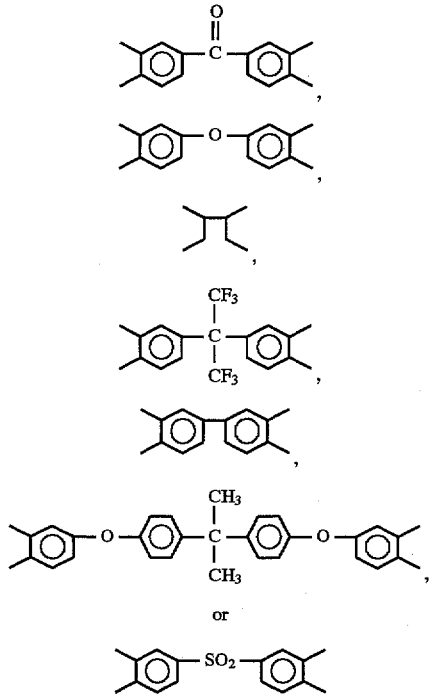
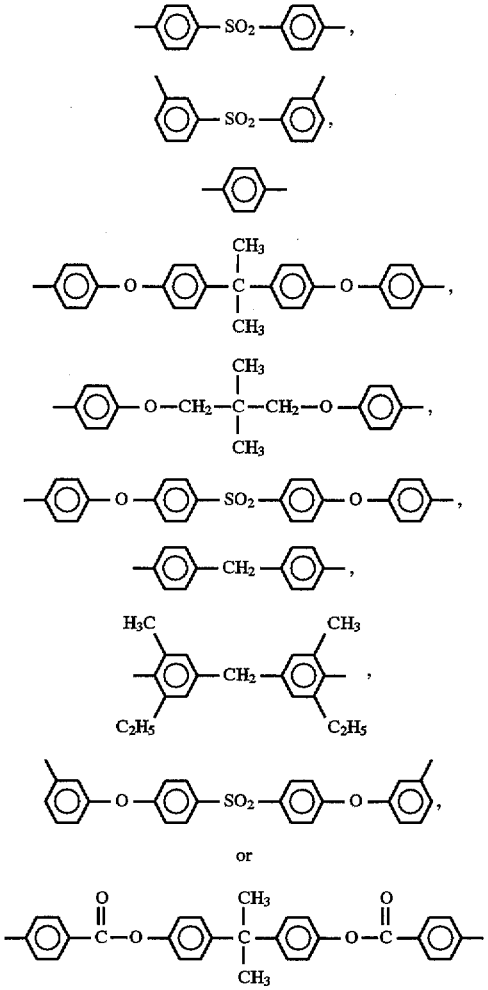
7. The thermoplastic polyimide as defined in claim 1, wherein said $Ar_6$ shown in the above general formula (1) comprises at least one radical selected from the group of divalent aromatic radicals as follows:
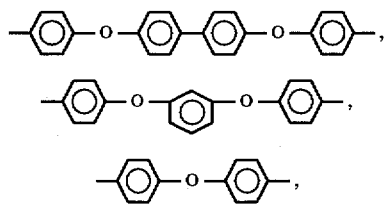
8. Thermoplastic polyimide represented by general formula (2) corresponding to the chemical structure as follows;
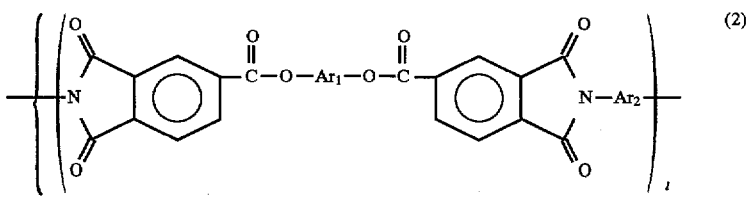
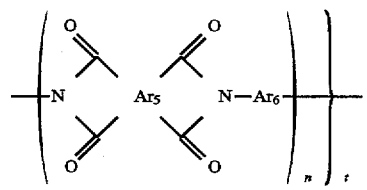

wherein $Ar_1$, $Ar_2$, and $Ar_6$, respectively designate divalent organic radical, $Ar_5$ designates a quadrivalent organic radical, l and t respectively designate positive a integer 1 or more than 1, and n designates a positive integer 0 or 1 or more than 1.

9. Polyamide acid represented by general formula (3) corresponding to the chemical structure as follows;

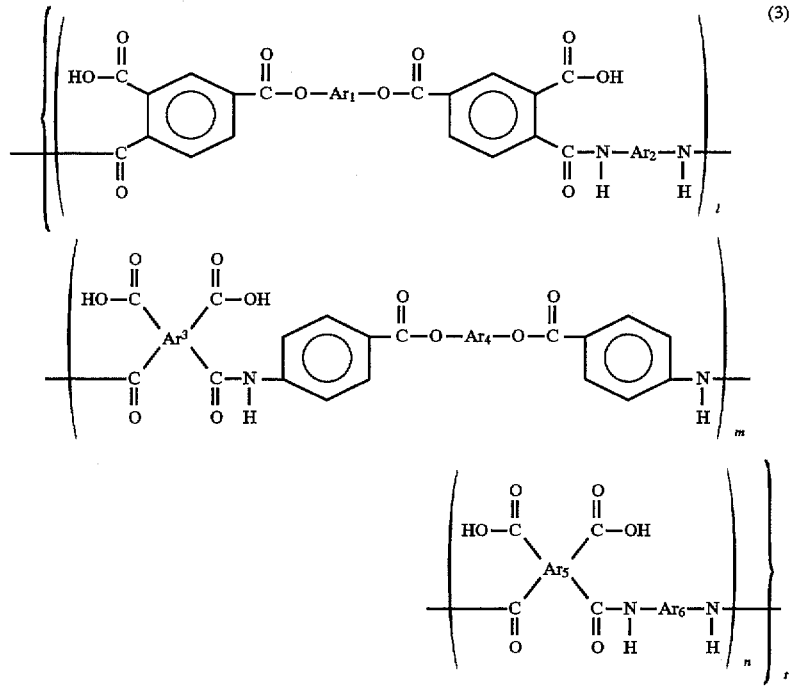

wherein $Ar_1$, $Ar_2$, $Ar_4$, and $Ar_6$, respectively designate divalent organic radical, $Ar_3$ and $Ar_5$ respectively designate a quadrivalent organic radical, 1, m, and n, respectively designate a positive integer 0 or 1 or more than 1, the sum of l and m is equal to 1 or more than 1, and t designates a positive integer 1 or more than 1.

10. Polyamide acid represented by general formula (4) corresponding to the chemical structure as follows;

wherein $Ar_1$, $Ar_2$, and $Ar_6$, respectively designate a divalent organic radical, $Ar_5$ designates a quadrivalent organic radical, l and t respectively designate a positive integer 1 or more than 1, and n designates a positive integer 0 or 1 or more than 1.

11. Thermally fusible laminated film for covering wires comprising;

a polyimide film; and a layer of welding agent comprising a thermoplastic resin as main component wherein said thermoplastic polyimide resin comprises a thermoplastic polyamide represented by the following formula (1);

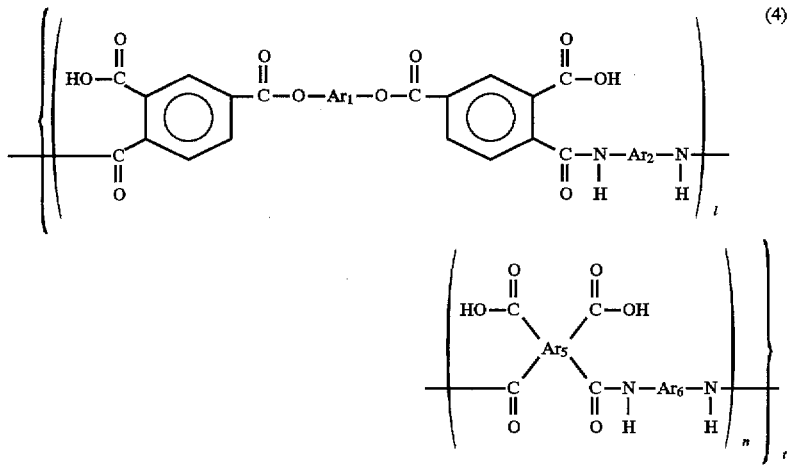

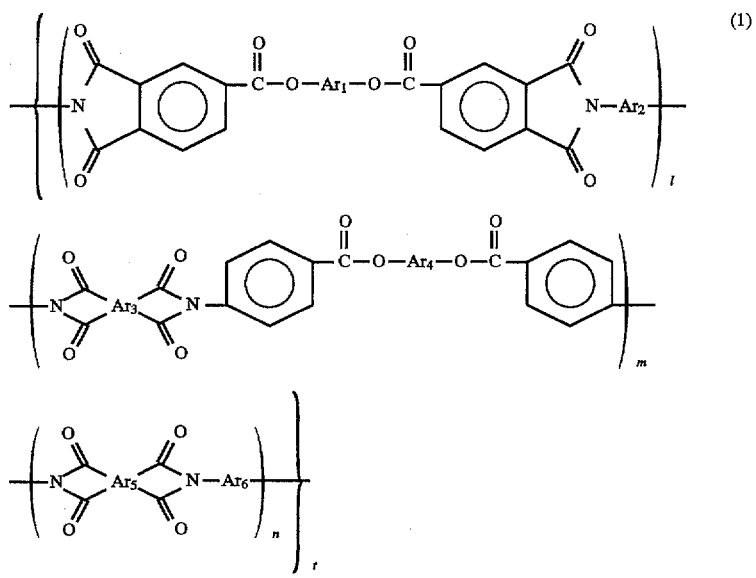

wherein $Ar_1$, $Ar_2$, $Ar_4$, and $Ar_6$ respectively designate divalent organic radical, $Ar_3$ and $Ar_5$ respectively designate quadrivalent organic radical, l, m, and n, respectively designate a positive integer of 0 or 1 or more than 1, the sum of l and m is equal to 1 or more than 1, and t designates a positive integer 1 or more than 1.

12. The thermally fusible laminated film as defined in claim 11, wherein said thermoplastic resin comprises the thermoplastic polyimide according to claim 1 and has a softening point of 220° C. or less than 220° C.

13. The thermally fusible laminated film as defined in claims 11 or 12, wherein said polyimide film comprises more than one kind of acidic dianhydrides represented by the chemical structure as follows:

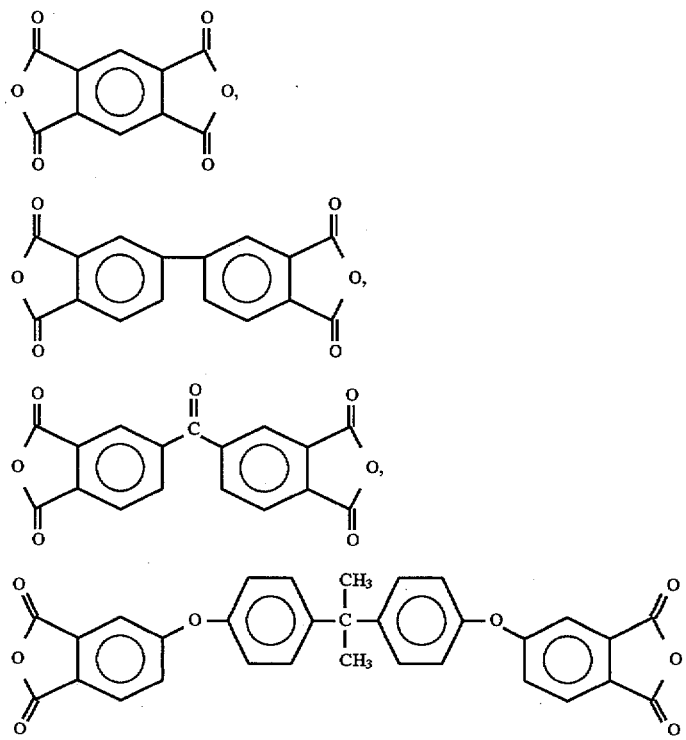

and more than one diamine selected from the group of diamines as follows:

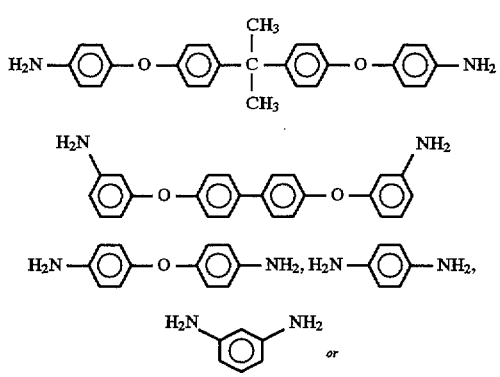
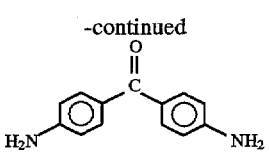
14. The thermally fusible laminated film according to claim 12, wherein said thermoplastic resin has softening point of less than amount 145° C.
15. The thermoplastic polyimide as defined in claim 1, wherein l is less than or equal to 15, m is less than or equal to 15 and n is less than or equal to 15.
* * * * *